Jan. 24, 1956  A. E. ALABASTER  2,732,517
STATIC ELECTRICITY DISCHARGERS
Filed Feb. 25, 1952
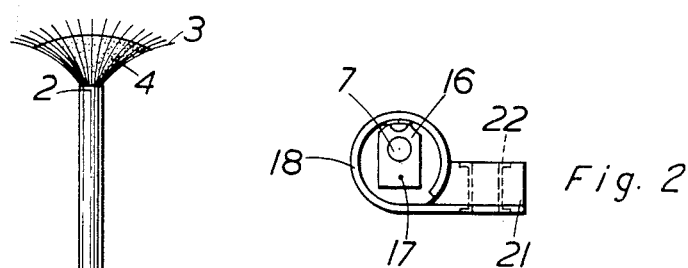
Fig. 2
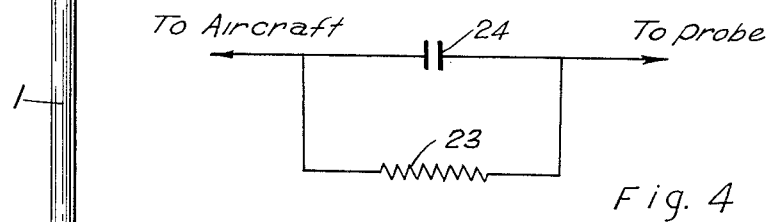
Fig. 4
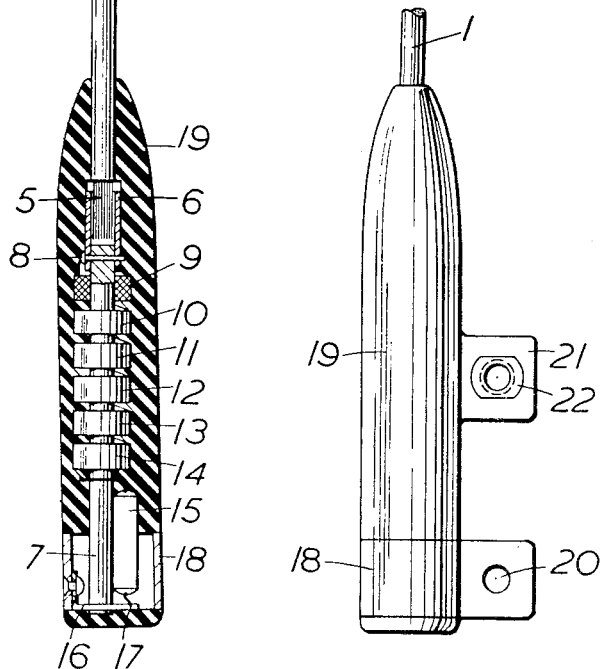
Fig. 1
Fig. 3
Inventor
Albert Ernest Alabaster
By
Stevens, Davis, Miller & Mosher
Attorneys

United States Patent Office 2,732,517
Patented Jan. 24, 1956

2,732,517

STATIC ELECTRICITY DISCHARGERS

Albert Ernest Alabaster, Wrecclesham, Farnham, England, assignor to National Research Development Corporation, London, England, a British corporation Application February 25, 1952, Serial No. 273,293

9 Claims. (Cl. 317—2)

The present invention relates to static electricity dischargers and more particularly to those adapted for use on aircraft.

Under certain atmospheric conditions the body of an aircraft tends to become electrically charged due to precipitation static. When the density of charge upon the aircraft becomes too great, a high potential exists at the extremities of the aircraft so that corona discharge occurs at these places and produces considerable noise and interference in the aircraft's associated radio apparatus.

In order to reduce corona discharge from parts of an aircraft or its associated aerials, means are often provided by which the precipitation static charge may leak away into the surrounding atmosphere by corona discharge at a potential lower than that at which discharge will take place from the extremities of the aircraft. These means are called static electricity dischargers and they are usually attached to aircraft at points where the distributed electrostatic charge has the highest density and therefore where the external potential gradient is greatest. It is a requirement of such dischargers that they should be capable of passing a current sufficient under reasonably severe conditions to keep the distributed charge on the aircraft below that at which unwanted corona discharge takes place and that they should themselves discharge without the radiation of substantial high frequency noise.

Such dischargers that have heretofore been used include impregnated silver cotton wicks and pointed wires. It has been found that in the case of cotton wick dischargers, the wicks are not durable and the discharge current tends to be insufficient while in the case of pointed wire dischargers the discharge tends to be rather noisy.

It has been established that the radiation of interfering noise impulses during corona discharge is due to the avalanche currents which commence each corona discharge pulse. By employing a multi-point fine wire bristle probe (defined for the purpose of this specification and the appended claims as containing of the order of hundreds of small diameter wire points at one end), the pulse repetition frequency of the corona discharge is increased, and the amplitude of the noise radiated decreased, by virtue of the lower potential gradient at which the discharge takes place. At the same time, the large number of fine wire points in the probe provide a considerable discharge current for a relative low potential gradient of discharge, which is indeed desirable but still results in an appreciable amount of noise radiation.

An object of the present invention, therefore, is to provide a static electricity discharger whereby there is obtained a reasonably high discharge current accompanied by a satisfactory degree of noise suppression.

According to the present invention, a static electricity discharger comprises a multi-point fine wire bristle probe, conductive means for connecting the discharger to a body from which static electricity charge is to be taken and a time-constant circuit connected between said probe and said conductive means.

According to a feature of the present invention, the time-constant circuit comprises a resistor and inductance connected in series. However, it will be understood that the term "time-constant circuit" includes series resistor-inductance circuits, parallel resistor-capacitor circuits or a combination of these circuits so constructed that there is a direct-current path through the circuit.

It has been found that by adjustment of the time-constant of the time-constant circuit which acts in combination with the inherent space charge which occurs around the discharge points during corona discharge, it is possible to control the rate of build up and decay of the discharge current with a consequent suppression of radiated noise at desired frequencies. The noise frequencies suppressed vary with the component values in the time-constant circuit.

In order that the invention may be more clearly understood, an embodiment thereof will now be described, by way of example, with reference to the accompanying drawings, in which:

Figure 1 is a part-sectional view of a static electricity discharger constructed according to the invention;

Figure 2 is an end view of the static electricity discharger shown in Figure 1;

Figure 3 is side view of part of the static electricity discharger shown in Figure 1.

Figure 4 shows a parallel resistor-capacitor time-constant circuit.

Figure 1 shows a probe 1 comprising a flexible insulating sheath 2 which contains a multiplicity of enamelled-copper wires. At one end of the probe 1 the insulating sheath is removed so that the wires form a mass of bristles 3 and these bristles are maintained spaced apart as shown at 4 by means of a suitable cement, such as that known under the trade name "Trolitol." At the other end of the flexible probe 1, the sheath is again removed (as shown at the point 5) and the wires are firmly electrically bonded into one end of a metallic sleeve 6. An insulating coil former 7 is firmly held in the other end of the sleeve 6 by means of a diametrical pin 8. Six inductance coils 9, 10, 11, 12, 13 and 14 are mounted on the former 7 and are electrically connected in series between the metallic sleeve 6 and a resistor 15 which is mounted alongside the former 7. The former 7 is located in a bracket 16 by passing through a suitably sized hole therein and the end of the resistor remote from inductance coil 14 is electrically connected to the bracket 16 at the point 17. In turn the metal bracket is revetted to an aluminium alloy fixing and connecting clip 18. The various parts of the discharger, apart from the protruding portion of the probe 1, are mechanically spaced in relation to one another by means of a suitable insulating plastic mould 19.

Figure 2 is an end view of the discharger shown in Figure 1, the mould 19 being removed for clarity. This figure shows the coil former 7, the metal bracket 16, the resistor connection point 17, and the fixing and connecting clip 18 and also shows, in conjunction with Figure 3, the clip 18 emerging tangentially from contact with the mould 19 and having a hole 20 therein for the purpose of mechanical and electrical connection to an aircraft or some other conductor from which a discharge will take place. In this manner, a continuous direct current path is provided between the bristles 3 and the aircraft or other conductor. Figures 2 and 3 also show a lug 21 of insulating material integral with the insulating mould 19 and having a metal ferrule 22 for additional mechanical fixing of the discharger to the aircraft or other conductor. Since the lug 21 is a non-conductor, the capacity between the inductances and the aircraft or other conductor to which the discharger is fixed is thereby made small.

The following physical and electrical dimensions have been found suitable for the discharger and will now be quoted by way of example.

Outside diameter of probe 1_____inches__ 0.125
Diameter of each of the bristles 3_____do____ 0.003
Length of the mould 19_____do____ 0.003
Resistance and rating of resistor 5
 K ohms, ¾ watts__ 33
Inductance of each inductance 9 to 14
 microhenries__ 600

The values given above for the resistance and inductance of the time constant circuit have been found to give a good noise suppression over the normal high frequency communication range of frequencies (2 mc./s. to 20 mc./s.), and some deviation from these values will tend to improve one part of the high frequency range to the detriment of another part thereof. For instance, an increase of resistance has been found to be advantageous at 2 mc./s. but detrimental at 12 mc./s., whilst an increase of inductance is slightly advantageous at 19 mc./s. but detrimental at 2 mc./s. Also, the values of resistance and inductance may be adjusted to suppress interference at frequencies outside the high frequency band.

The wires of the probe 1 and bristles 3 need not be of enamelled copper but may be made from suitable stainless alloy.

Figure 4 shows a time-constant circuit using a resistor 23 and a condenser 24 in parallel, of values selected to give a high discharge current, but at the same time, to satisfy a degree of noise suppression by reason of controlling the frequency of the discharge to a predetermined value outside the range of those frequencies that will interfere with aircraft radio transmission and reception.

I claim:

1. A static electricity discharger for discharging static electricity from a charged body into a surrounding atmosphere and comprising a probe having a multiplicity of fine wire bristles at one end thereof, a conductor in the probe and connected to the bristles, conductive means for electrically connecting the discharger to the body and a resistance and an inductance connected in series between the conductive means and the other end of the probe.

2. A static electricity discharger as claimed in claim 1 and wherein the inductance, the resistance and part of the probe are enclosed in dielectric material.

3. A static electricity discharger for discharging electricity from a charged body into the surrounding atmosphere and comprising a probe having of the order of hundreds of fine enamelled-copper wires therein, the said enamelled-copper wires being adapted to form a multiplicity of discharge points at one end of the probe, an inductance and a resistance connected in series with one another, means for connecting the inductance to the said wires at the other end of the probe, a conductive clip for connecting the discharger to the body and means for connecting the clip to the resistance.

4. A static electricity discharger as claimed in claim 3 and wherein the probe comprises an insulating sheath containing the fine enamelled-copper wires over part of their length.

5. A static electricity discharger as claimed in claim 3 and comprising dielectric material surrounding the inductance and the resistance and a lug for fastening the dielectric material to the body, the said conductive clip being adapted to firmly engage the dielectric material.

6. A static electricity discharger for discharging electricity from a charged body into the surrounding atmosphere and comprising a probe having of the order of hundreds of enamelled-copper wires therein, the enamelled copper wires being adapted to form a multiplicity of discharge points at one end of the probe, an inductance and a resistance connected in series with one another, means for connecting the inductance to the wires at the other end of the probe, a conductive fitment for connecting the discharger to the body and means for connecting the fitment to the resistance, the values of the inductance and resistance being so chosen that radio interference caused by the discharge of electricity from the probe is greatly reduced at predetermined frequencies.

7. A static electricity discharger as claimed in claim 6 and wherein the probe comprises an insulated sheath containing the fine enamelled-copper wires over part of their length.

8. A static electricity discharger as claimed in claim 6 and comprising dielectric material surrounding the inductance and resistance and a lug for fastening the dielectric material to the body, the said conductive fitment being adapted to engage firmly the dielectric material.

9. A static electric discharger for discharging electric currents from a charged body into a surrounding atmosphere comprising a probe having a multiplicity of fine wire bristles at one end thereof, a conductor in said probe and connected to said bristles, conductive means for electrically connecting the discharger to said body, and circuit means to control the rate of buildup and decay of said current, connected between said conductive means and the other end of said probe to suppress radiation of noise at radio frequencies.

References Cited in the file of this patent

UNITED STATES PATENTS

| | | |
|---|---|---|
| 2,293,918 | Planiol | Aug. 25, 1942 |
| 2,311,608 | Hucke | Feb. 16, 1943 |
| 2,320,146 | Leake | May 25, 1943 |
| 2,325,414 | McChesney | July 27, 1943 |
| 2,466,311 | Hall | Apr. 5, 1949 |
| 2,497,924 | Beach | Feb. 21, 1950 |

FOREIGN PATENTS

| | | |
|---|---|---|
| 627,241 | Great Britain | Aug. 3, 1949 |